Feb. 4, 1941. W. E. OAKEY 2,230,845
MANUFACTURE OF CAPPED ARTICLES
Filed July 19, 1937 7 Sheets-Sheet 1
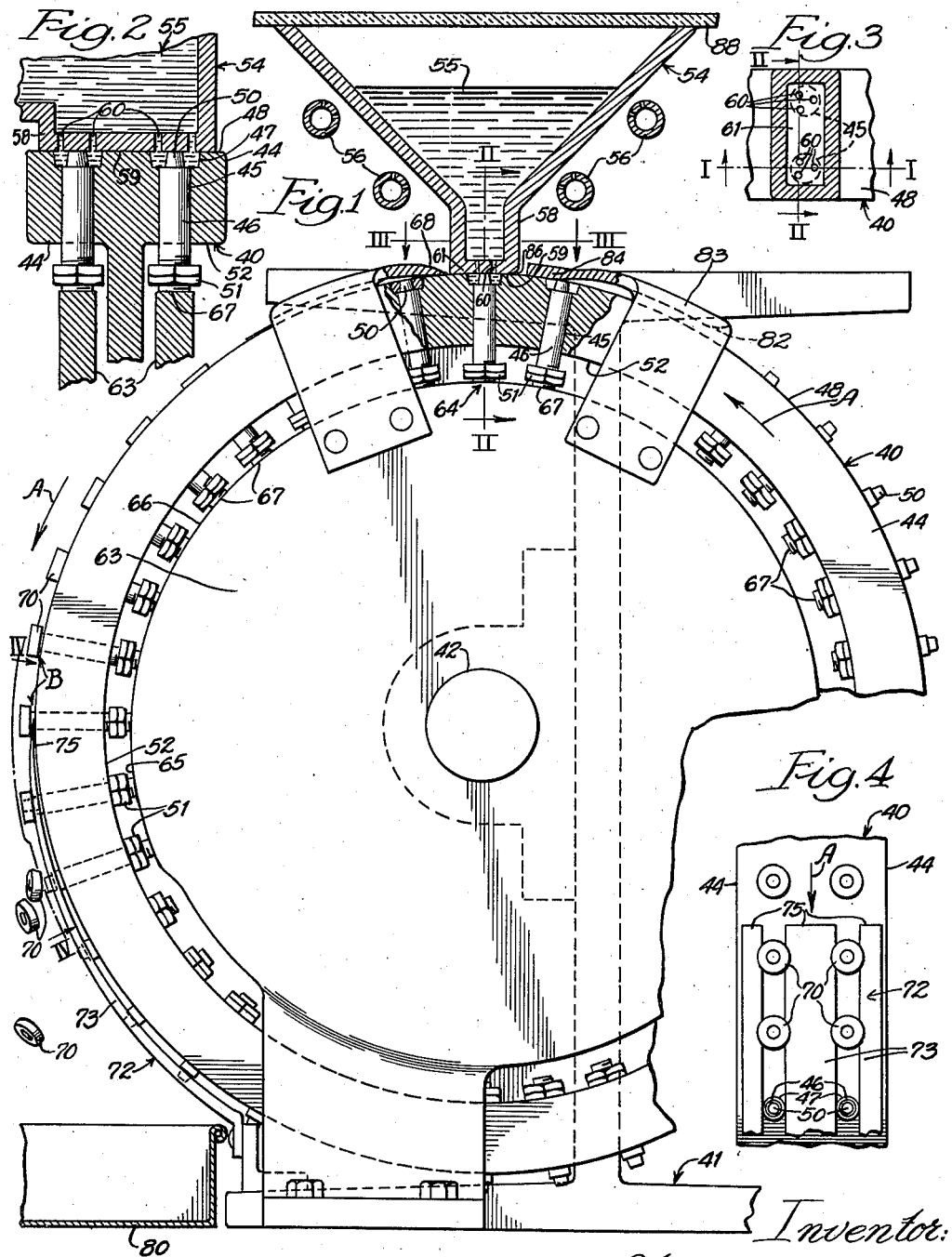

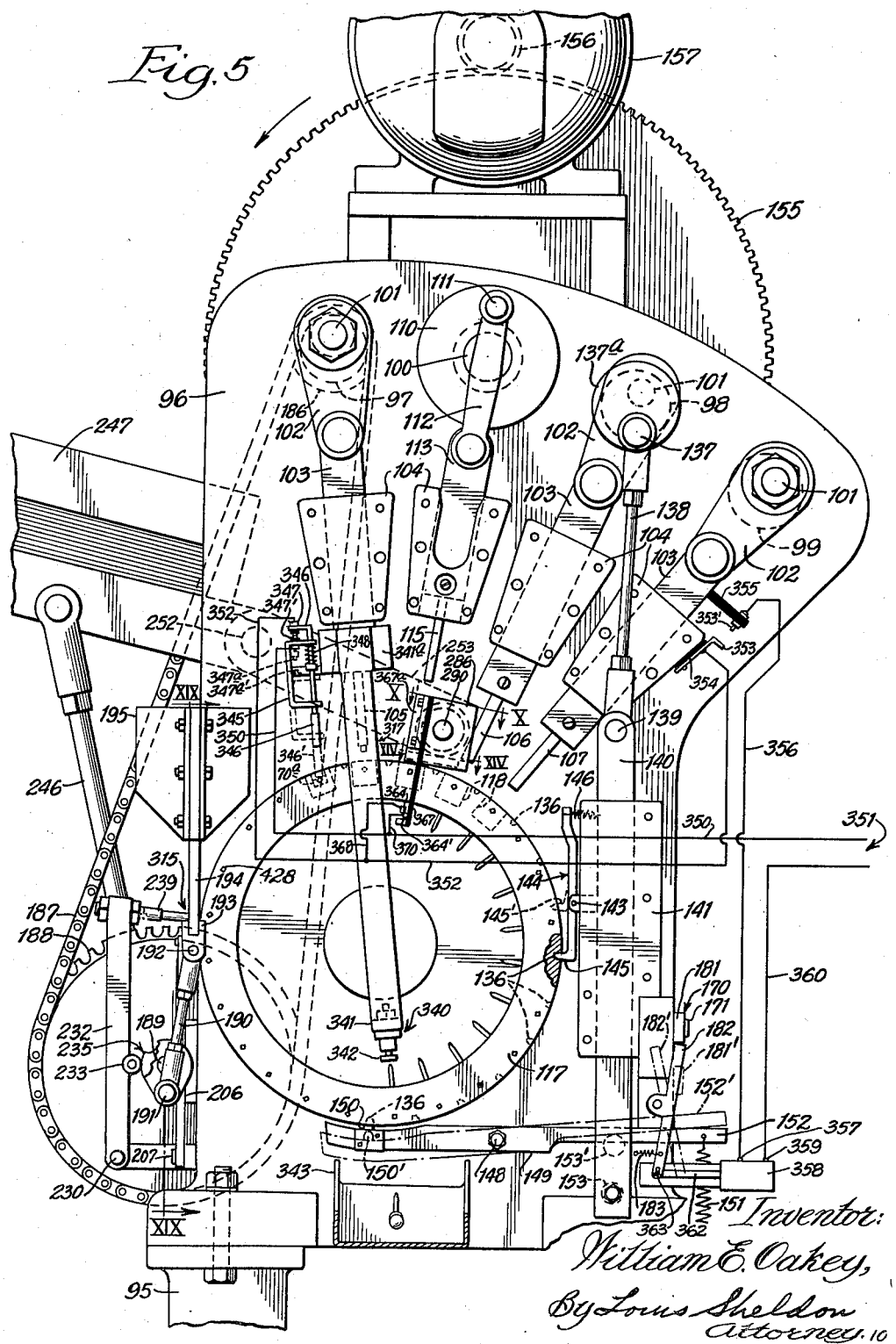

Feb. 4, 1941. W. E. OAKEY 2,230,845
MANUFACTURE OF CAPPED ARTICLES
Filed July 19, 1937 7 Sheets-Sheet 3

Feb. 4, 1941.     W. E. OAKEY     2,230,845
MANUFACTURE OF CAPPED ARTICLES
Filed July 19, 1937     7 Sheets-Sheet 4
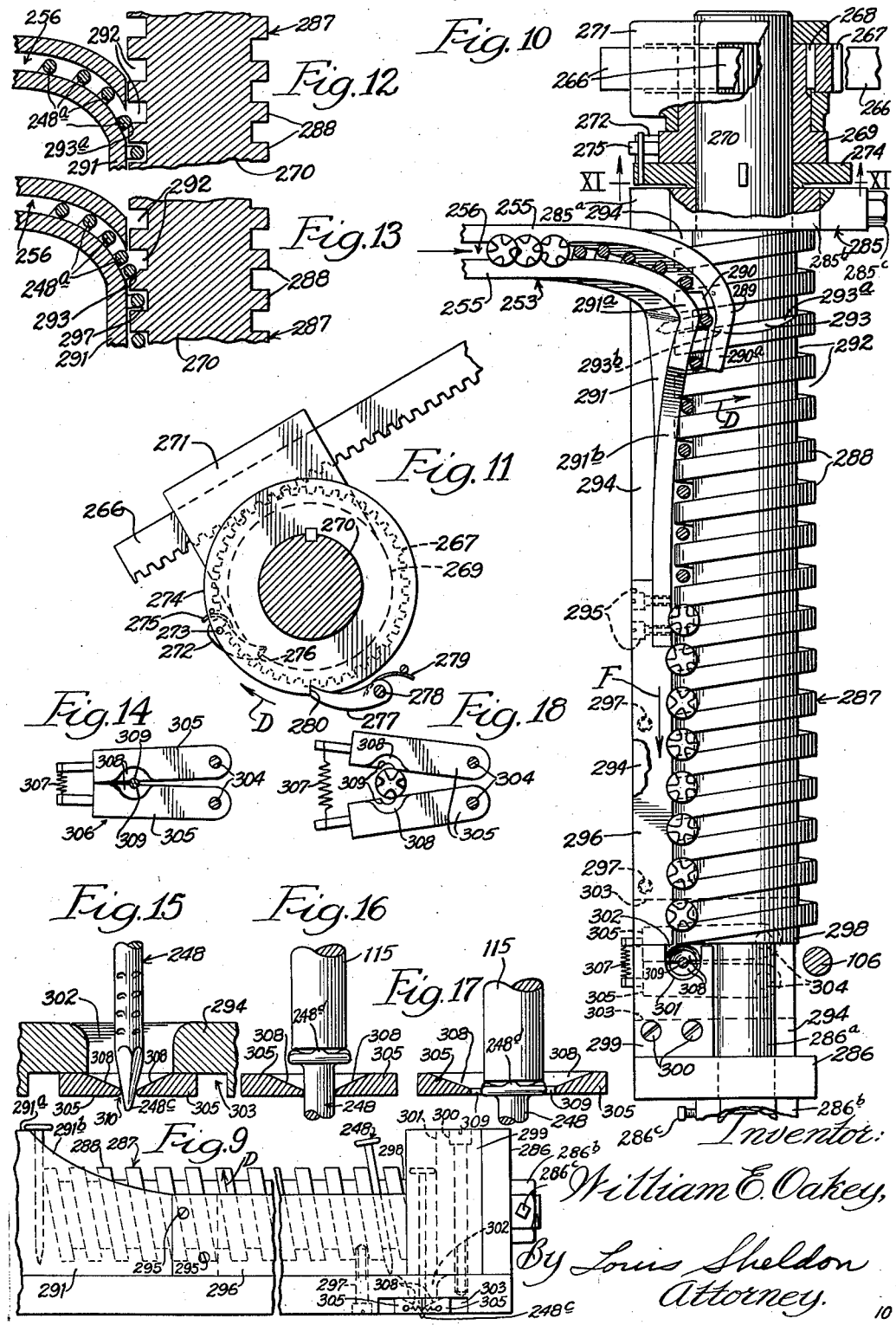

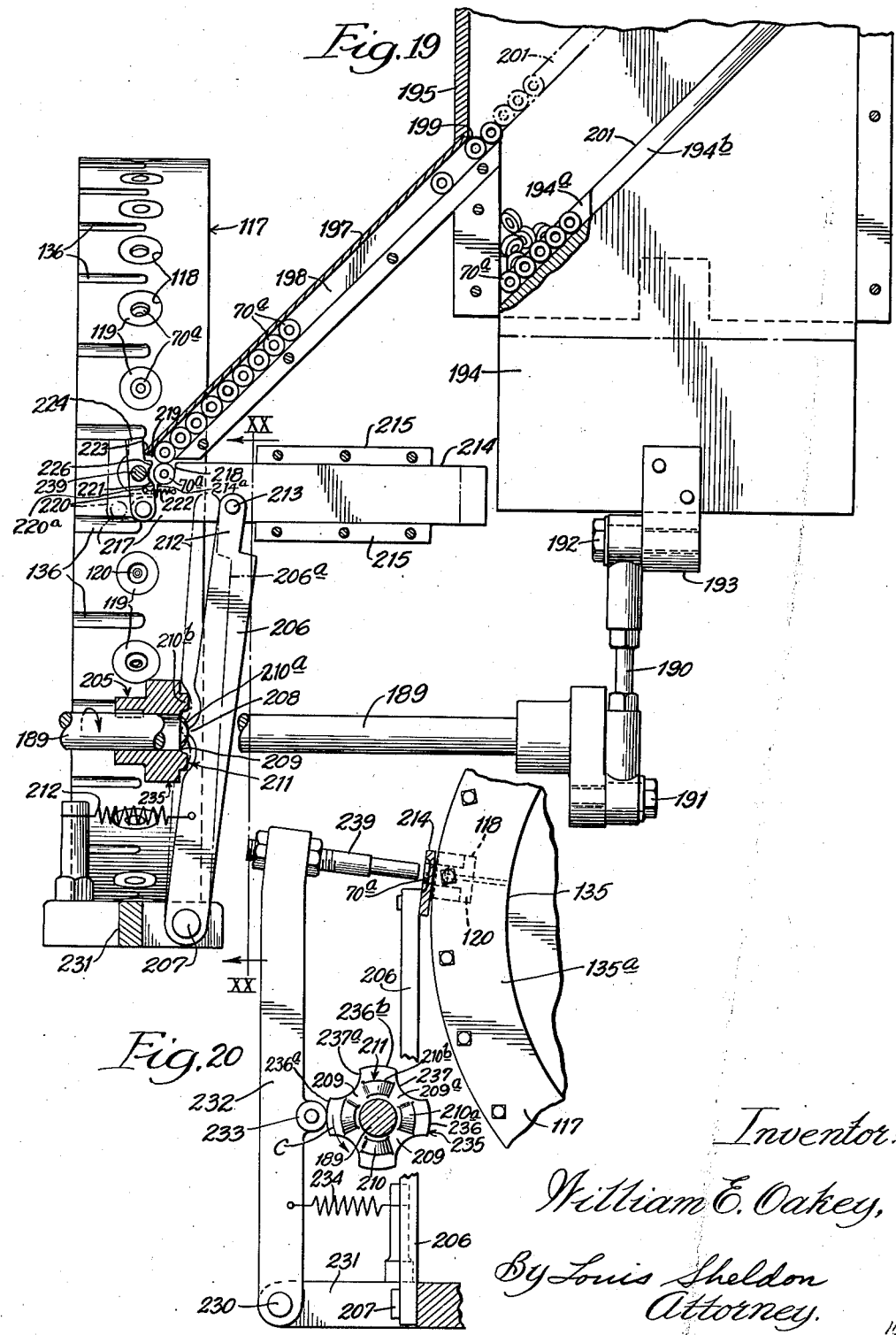

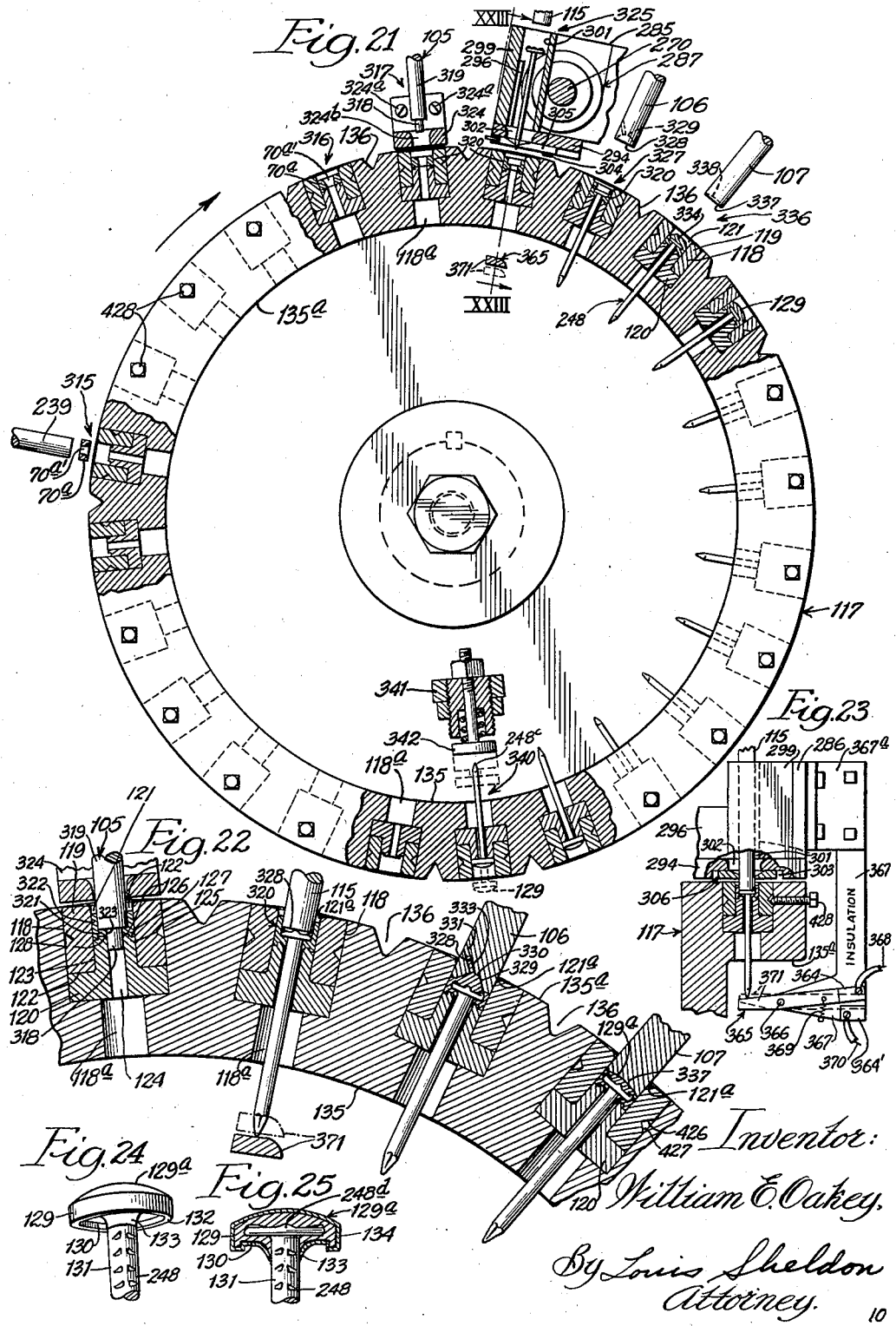

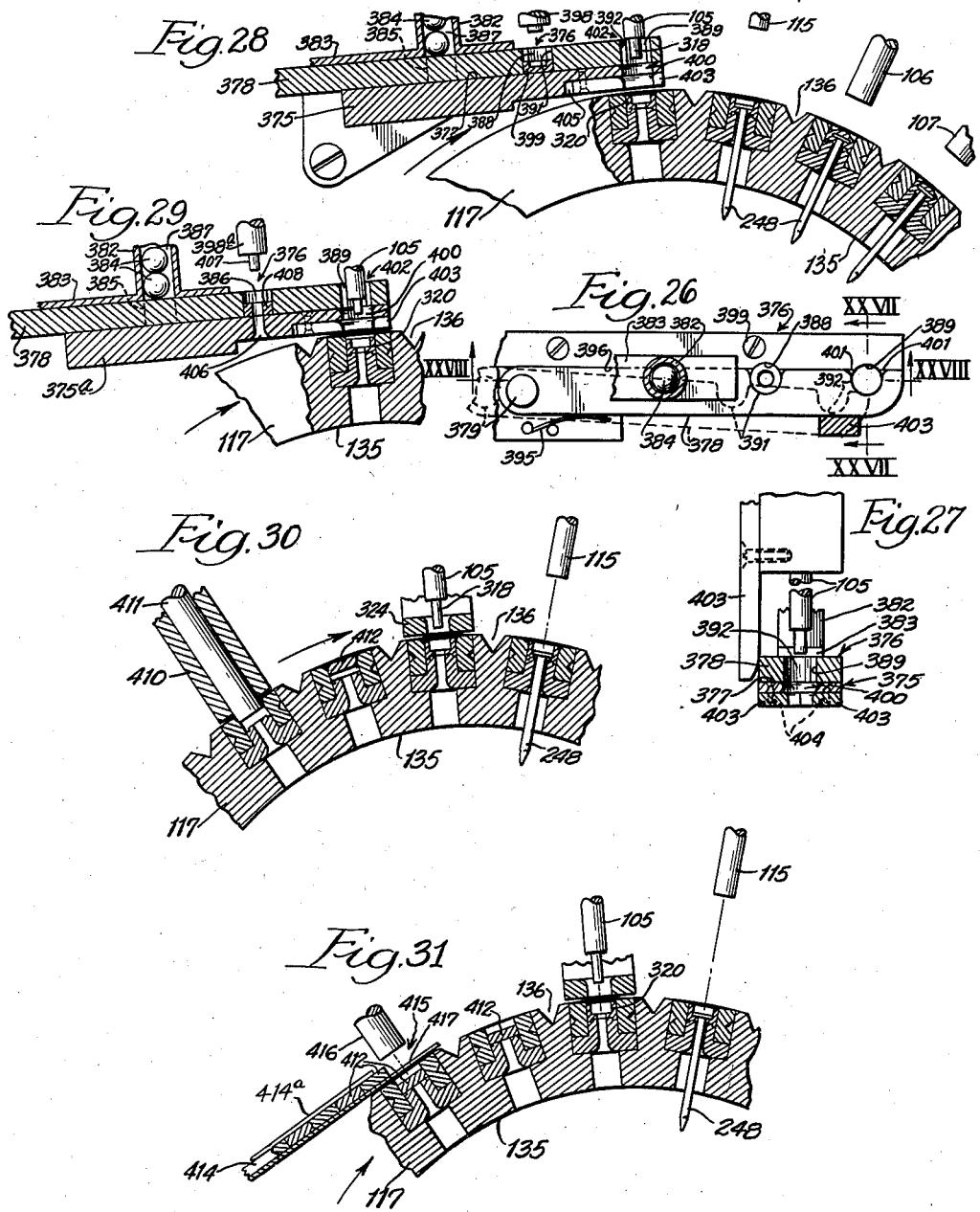

Patented Feb. 4, 1941

2,230,845

UNITED STATES PATENT OFFICE 2,230,845

MANUFACTURE OF CAPPED ARTICLES

William E. Oakey, Evanston, Ill., assignor to Filshie Lead Head Nail Company, Inc., Chicago, Ill., a corporation of Illinois Application July 19, 1937, Serial No. 154,375

13 Claims. (Cl. 10—158)

This invention relates to the manufacture of lead capped nails and other articles, and more particularly to the production of masses or slugs of lead or the like soft material for employment in such manufacture, and to the application of the cap by pressure.

It is an object of my invention to provide an apparatus for producing soft metal washer-like or other masses expeditiously and economically.

It is another object of the invention to provide an apparatus for expeditiously and economically securing caps of relatively soft metal or other material to the heads of nails, screws, bolts, screw-nails, fasteners and other elements.

It is a further object to provide means for forming caps on headed elements, employing preformed cap metal slugs, wherein provision is made for the escape of excess capping material and air.

Another object of the invention is to provide a capping machine constructed to automatically stop capping operations in the event of failure to feed a part of the article to be produced.

It is a further object to provide, in a machine of this character, mechanism for automatically stopping the machine in the event of failure to feed a mass of capping material.

It is also an object of my invention to provide a machine of this character with mechanism for automatically stopping the machine in the event of failure to feed the part to be capped.

Another object of the invention is to provide a punch type of machine for capping fastening and other elements, wherein provision is made for the ejection of the capped articles by a punch-actuated means.

It is another object of the invention to provide improved die construction.

It is also an object to provide a simple process of making dies economically and with great precision.

A further object is to provide, in a machine of this character, improved feeding mechanism for the articles to be capped.

It is a further object of this invention to provide, in a machine of this character, improved feeding mechanism for the capping material.

Another object of the invention resides in the provision of an improved capped fastening element.

An object of the invention is to provide a new process for manufacturing capping metal slugs.

Another object resides in a new process for manufacturing capped fasteners.

It is a further object to provide an improved method of lubricating the cap-forming dies.

Further objects and advantages of the invention will appear as the description proceeds.

The invention is illustrated in the accompanying drawings, in which—

Fig. 1 is a fragmentary section-elevation of an apparatus embodying the invention for preforming slugs of capping material, taken as indicated by the line I—I in Fig. 3.

Fig. 2 is an enlarged fragmentary section-elevation taken as indicated by the lines II—II in Figs. 1 and 3.

Fig. 3 is a fragmentary sectional view taken as indicated by the line III—III in Fig. 1.

Fig. 4 is a fragmentary elevation taken as indicated by the line IV—IV in Fig. 1, showing the means for stripping the masses of capping material from the machine for producing the same.

Fig. 5 is a fragmentary front view, partly in section and partly in elevation, of a nail capping machine embodying the invention.

Fig. 6 is a fragmentary rear view, partly in section and partly in elevation, of the machine appearing in Fig. 5, and taken as indicated by the line VI—VI in Fig. 8.

Fig. 7 is a fragmentary sectional plan view taken as indicated by the line VII—VII in Fig. 6.

Fig. 8 is a fragmentary sectional view taken as indicated by the line VIII—VIII in Fig. 6, showing details of the clutch of the machine.

Fig. 9 is a fragmentary side elevation of part of the nail feeding mechanism, further appearing in Fig. 10.

Fig. 10 is an enlarged fragmentary top view partly in section and partly in elevation, taken as indicated by the line X—X in Fig. 5.

Fig. 11 is a fragmentary sectional view taken as indicated by the line XI—XI in Fig. 10.

Figs. 12 and 13 are fragmentary sectional plan views of details of operation of the structure shown in Fig. 10.

Fig. 14 is an enlarged plan view, partly in section, taken as indicated by the line XIV—XIV in Fig. 5.

Fig. 15 is a view of the same structure but in elevation, showing a nail about to be fed for the capping operation.

Fig. 16 is similar to Fig. 15 but shows the nail at an advanced stage of its feeding.

Fig. 17 is a view similar to Fig. 16 showing the nail near the completion of its feeding stroke.

Fig. 18 is a plan view similar to Fig. 14 with the nail in the position indicated in Fig. 17.

Fig. 19 is an enlarged fragmentary view partly in section and partly in elevation, taken as indicated by the line XIX—XIX in Fig. 5.

Fig. 20 is a view partly in section and partly in elevation, taken as indicated by the line XX—XX in Fig. 19.

Fig. 21 is a fragmentary enlarged view, partly in section and partly in elevation, of the die-carrying index plate and associated feed, cap-forming and ejecting mechanism.

Fig. 22 is an enlargement of the cap forming die and punch structure appearing in Fig. 21.

Fig. 23 is a section-elevation taken as indicated by the line XXIII—XXIII in Fig. 21, but with the nail fed in the die.

Fig. 24 is an enlarged fragmentary isometric view of a fastening element having a cap made in accordance with the invention.

Fig. 25 is a fragmentary longitudinal section through the structure appearing in Fig. 24.

Fig. 26 is a fragmentary plan view of another form of slug-forming and feeding mechanism embodying my invention.

Fig. 27 is a fragmentary transverse sectional view taken as indicated by the line XXVII—XXVII in Fig. 26.

Fig. 28 is a fragmentary longitudinal sectional view taken as indicated by the line XXVIII—XXVIII in Fig. 26.

Fig. 29 is a view similar to Fig. 28 but shows a modified structure.

Figs. 30 and 31 are fragmentary sectional views of additional forms of slug-forming and feeding mechanism.

The present invention has to do with the manufacture of capped fastenings and other articles. I have found it advantageous to employ preformed lead or other soft metal masses or slugs in the production of such articles. In accordance with the present invention, such masses may take various forms, including discs and washers.

Figs. 1, 2, 3 and 4 illustrate an apparatus embodying my invention for the production of washer-like slugs of capping material. This apparatus may comprise a wheel 40 mounted on a frame-work 41 to be rotated about an axis 42 by a motor and/or other suitable mechanism (not shown) of any desired character. Disposed radially in one or each flange 44 of the wheel is a series of holes 45, in each of which a plunger or pin 46 is slidably received. Each hole 45 is conically countersunk at 47 at the outer periphery 48 of the wheel. Each pin 46 has at its outer end a preferably tapered pilot 50 and adjacent its other end carries a collar 51 which, as will appear, prevents excessive projection of the pin 46 radially outwardly by engagement of the collar with the inner side 52 of the flange 44. The wheel is preferably disposed on a horizontal axis.

It is desirable for certain purposes, such as in roofing where corrugated and other roofing members are to be fastened in place, to employ fastenings such as common nails, screw nails, fasteners (such as those secured by drawing their pliable shanks taut and bending them about purlins and other anchoring members), bolts and rivets and the like, the heads of which are encased in relatively soft material of the character of lead, having the property of flowing upon the application of hammer blows or other stress to provide a seal at the opening through which the shank of the securing element projects. Lead is an example of such material which has been found suitable. Capped articles for ornamental and other purposes may be produced in accordance with the invention.

Disposed over the wheel 40 is a kettle 54 adapted to contain a bath 55 of molten lead or other soft metal having the desired properties. The kettle 54 may be heated by any suitable means. For illustrative purposes only, there are shown a plurality of gas pipes 56 adapted to be regulated by suitable means (not shown) and to throw flame against the sides of the kettle, which is preferably made of iron, steel or other suitable material. Suitable means (not shown) may be employed to regulate the temperature of the bath to obtain best results for the operation of the machine.

The kettle has a downwardly offset portion 58 which extends over the top of the wheel 40 and whose bottom surface 59 has a curvature which is substantially that of the outer surface 48 of the wheel and which, in practice, has substantially a sliding engagement therewith. The projection 58 has one or more openings 60 in its bottom wall 61, said openings being arranged to register with each opening 47 in succession, as the wheel rotates. Said openings are provided for the purpose of permitting the molten metal of the bath to escape into the openings 47 at times when said openings are annular, due to the projection of the nose or pilot 50 therein, as will be seen in Figs. 1, 2 and 3.

The direction of rotation of the wheel when in the illustrated relation to the associated mechanism is shown in Figs. 1 and 4 at A. There is provided a preferably stationary cam plate or other means 63 and, from the top point 64 thereof to a point which may be adjacent the horizontal level of the axis of the wheel, as at 65, has a cam surface 66 of gradually increased radius in the direction of rotation of the wheel. The inner end 67 of each pin 46 is arranged to ride along this cam surface 66. As each opening 47 passes under the holes 60, the metal liquid flows and fills the annular space formed by the wall of the opening 47 and the pilot 50 of the pin projecting therein. The motion of the wheel and the fluidity of the bath are such that sufficient metal flows to at least completely fill the annular space. As the wheel progresses away from the kettle some metal may flow onto the outer periphery 48 of the wheel between the aforesaid opening 47 and the next succeeding one, if there is any place between the substantially sliding surfaces of the wheel and kettle to permit such flow. Because of this close fit, also, the kettle surface 59 performs a wiping action. Upon the further progress of the wheel, and preferably just in advance of the offset portion 58, there is provided a knife 68 which is stationarily mounted and which slidably contacts the outer periphery of the wheel and strips off such excess metal as has escaped onto the outer periphery of the wheel between consecutive openings 47. The cap metal at this point is quite soft and is easily removed.

Accordingly the portion of the outer periphery of the wheel which has progressed beyond the knife 68 is substantially free of the soft metal except for the metal which fills the annular spaces. As these portions containing the cast metal proceed, the pins 46 are riding on the cam surface 66 and because of the increasing radius of the surface 66 the pins 46 are gradually forced radially outward as may readily be observed at the left of Fig. 1. The parts are dimensioned to enable the surface 66 to move the pins out to such an extent as to hold the cast washer or slug 70 clear of the outer periphery of the wheel as shown at B. This is shown at the horizontal plane of the axis of the wheel but may be arranged elsewhere if desired.

Stationarily secured in advance of this portion is a stripper device 72 comprising prongs 73 which are spaced apart a distance which is less than the diameter of the washer and greater than the diameter of the pins 46. The ends 75 of the prongs first approached by the ejected slugs are preferably tapered as shown and arranged so that they engage under the ejected slugs and force them off the pins as shown in Fig. 1. Continued turning of the wheel causes each slug to ride up the tapered surfaces of the stripper. Early in this movement the collar 51 abuts the inner side 52 of the wheel. At this point, the outer surfaces of the stripper prongs 73 are inclined away from the axis of the wheel, so that as the rotation of the wheel proceeds, the slugs are cammed off the pilots 50 and completely separated therefrom, the slugs so separated gravitating into a bin 80.

The walls of the holes 45 and the pilots 50 are preferably tapered as shown to facilitate the removal of the slugs therefrom by the stripper. Insofar as the finished capped article and the process of making the same are concerned, the inner and outer peripheries of the slug could be cylindrical or any other suitable shape.

I have illustrated the wheel 40 as having two series of slug forming recesses and associated pins, the offset 58 of the kettle 54 being correspondingly formed to supply metal for both series. There are accordingly provided two cams 63 and the stripper has additional prong means so that both series of finished slugs may be stripped simultaneously. Obviously one or any desired number of series may be provided.

The pins have a loose sliding fit in their respective bores, and after passing beyond the end 65 of the cam surface 66, and when they are near the top portions where they are again to be employed in the casting of slugs, they will slide by gravity to their radial inner positions as may be seen at the upper right of Fig. 1. Should any of the pins, for any reason, stick so as to remain in an outer position at this point, the pilots 50 of such pins will be engaged with the cam surface 82 of a bracket 83 stationarily mounted, said bracket having an advanced portion 84 disposed in substantially sliding engagement with the outer periphery of the wheel to positively insure the complete retraction of the pins 46 with the pilots 50 substantially flush with or slightly inward of said outer periphery.

If desired, the side 86 of the bottom 59 of the kettle first approached by the pins may be tapered toward the periphery of the wheel to insure against obstructive engagement between the pilots 50 and the offset portion 58 of the kettle, should for any reason the pilots be elevated unduly.

The stripper 72 is preferably spaced a substantial distance from the place where the molten metal is charged into the recesses 47, in order to give the metal ample time to harden so that the slugs will not be appreciably distorted by the force applied by the stripper 72 in stripping the slugs from the pins 46.

Asbestos or other covering means 88 may be disposed over the kettle 54.

After the slugs 70 are stripped from the casting apparatus, they are tumbled preferably with powdered graphite. At the completion of the tumbling, each slug is covered by a film of graphite and is in condition to be fed into the punching machine which will be described presently. The slugs so treated will be referred to hereafter by the reference character 70a.

A punching machine embodying the invention is shown in Figs. 5 et seq. It comprises a suitable frame 95 carrying a casing 96 in which are rotatable three eccentric shafts 97, 98 and 99 and a concentric shaft 100. Each eccentric shaft projects forwardly of the casing 96 and has a crank pin 101 to which is secured a connecting rod 102 in turn connected to a reciprocal plunger or punch head 103. The heads are arranged to reciprocate in guides 104 which may be mounted on the casing 96 and support punches 105, 106 and 107, respectively.

The shaft 100 carries a plate 110 provided with a crank pin 111 to which is secured a connecting rod 112 in turn secured to a plunger or head 113 reciprocal in a guide 104. The head 113 carries a feed pin or punch 115 which is employed to feed fastenings or other articles to be capped by the machine, as will appear.

The casing also rotatably carries a turret 117 arranged preferably to rotate about a horizontal axis and provided with a circumferential series of radial openings 118. In each opening (Figs. 21, 22 and 23) there is disposed a die which may be made in one or more pieces and, as illustrated, comprises two pieces 119 and 120. The piece 119 is in the form of a collar in whose bore 121 the outside of the finished cap is to be formed. The complemental piece 120 has a flange 122 against which an end of the collar 119 fits and a substantially central boss 123 which projects part way into the collar 119 and has a tight driving or force fit therein. The piece 120 has a bore 124 which is preferably coaxial with the bore 121 of the collar 119. The free end 125 of the boss 123 may be of any suitable configuration, which the bottom of the cap ultimately will have. Accordingly the illustrated shape is to be regarded as one of choice and not one of limitation. The boss illustrated, it will be observed, has its central portion 126 projecting beyond its outer peripheral portion 127, and the inner edge of the central projecting portion is preferably chamfered as at 128. It will be noted that this construction will provide the bottom of the cap 129 with an annular recess 130 on its under side about the shank of the fastening or other article 131, forming an outer skirt 132 and an inner wedge 133, covered by a film 134 of graphite, as will be seen in Figs. 24 and 25.

The two piece die structure is secured in its opening 118 in the disc or turret 117 by any suitable means such as a set screw 428 (see below) so as to be easily removed and replaced. The turret has a reduced bore 118a communicating with and extending inwardly of the bottom of the opening 118 and terminating at the inner surface 135 of the peripheral flange 135a in which the openings are formed. The series of openings in the turret 117 may be located so that the axes of the dies mounted therein are disposed in the same plane as the axes of the punches 105, 106 and 107 and the feed ram 115. It will also be observed that the punches 105, 106 and 107 and the ram 115 may be disposed radially with respect to the turret 117. Two or more series of dies and associated punches and rams may be provided, only one series being illustrated here for convenience.

The turret is provided with a circumferential series of slots 136 equally numerous with the turret holes and also equally spaced. Secured to any one of the eccentric shafts, such as the eccentric shaft 98, as by the crank pin 137 mounted on the shaft flange or disc 137a is a connecting rod 138 which is also pivotally connected at 139 to a rod 140 reciprocal in a guide 141. Pivotally mounted on the rod 140 at 143 on a lug movable in a slot in the guide adjacent the outer periphery of the turret 117 is a pawl 144 having a tooth 145 engageable selectively in the slots 136, the other end of the pawl being urged by a spring 146 toward the rod 140, so as to constantly urge the tooth 145 against the outer periphery of the turret.

Pivotally mounted at 148 on a stationary part of the machine is a pawl 149 having a tooth 150 constantly urged by a spring 151, associated with the opposite end 152 of the pawl, into engagement with the outer periphery of the turret 117. The rod 140 extends below the end 152 of the pawl 149 and has a lug or roller 153 which projects under the pawl end 152.

The parts are arranged as they appear in Fig. 5 just at the completion of an indexing movement of the turret 117. This movement or indexing is effected by a downward movement of the rod 140 which, due to the engagement of the pawl tooth 145 in one of the slots 136 as shown in dotted lines at 145', moves the pawl tooth 145 to the full line position, the pawl tooth being held in the slot by virtue of its shape and that of the slot. Of course, in order for this movement to be possible, the tooth 150 must be out of any slot 136 in the turret. When the rod 140 is upraised, the lug 153 is in such position, 153', as to hold the end 152 of the lever 149 elevated as at 152' to such an extent as to retain the tooth 150 clear of the turret 117, as shown at 150'. At the time that the down or working stroke of the rod 140 is to commence, the tooth 150 is in line with but removed from a slot 136, while the tooth 145 is disposed in another of said slots as shown at 145'. As the rod 140 descends, it transmits a force to the turret through the pawl tooth 145, rotating the turret. As the rod 140 proceeds in its descent its lug 153 recedes downward and finally moves clear of the pawl end 152 as the spring 151 brings the tooth 150 into engagement with the outer periphery of the turret between successive slots 136. While the tooth 150 is so positioned, it of course cannot obstruct the rotation of the turret, which rotation proceeds until the crank pin 137 is at its nadir, when the tooth 145 reaches the end of its driving stroke as shown in full lines in Fig. 5. By this time the tooth 150 will have snapped into a slot 136, as shown in Fig. 5, and this tooth retains the turret in the position shown until the tooth 145 is raised to its dotted line position as shown at 145', preparatory to the commencement of another indexing stroke. When the tooth 145 is fully raised, the tooth is retracted by the roller 153, as shown in dotted lines, to permit the tooth 145 again to drive the turret. The tooth 150 locks the turret positively in position with the punches lined up with the dies.

This escapement mechanism accordingly provides for a positive indexing of the turret and also positive means to prevent movement of the turret between indexing movements thereof. It is evident therefore that the turret cannot move except when the various plungers are clear of it. It will be observed that when the plungers are clear of the turret, the turret is indexed, and when the turret is stationary the plungers perform their working operations.

The shafts 97 to 100 are interconnected as by gearing 154 shown in Fig. 6, the shaft 100 supporting a flywheel 155 (Figs. 5 and 8) geared at 156 to a motor 157. It will be observed that the shaft 100 has a slot or keyway 159 and the flywheel has a slot 160 adapted to register with the keyway 159. Slidably mounted in the slot 159 is a clutch pawl or dog 161 having a pilot 162 received in a hole 163 in the shaft 100 at an end of the slot 159. A spring 164 about the pilot and compressed between the shaft 100 and the dog 161 constantly urges the dog toward the flywheel with a view to engaging and maintaining the key in the slot 160 to clutch the flywheel in driving relation to the shaft 100, as shown in Fig. 8.

This clutch is controlled by a trip lever 170 which is preferably disposed at a side of the machine casing and pivotally mounted thereon at 171. The lever 170 projects forward clear of the machine for ready access to the hand of the operator, and has pivotally connected to the rear end 172 a thrust rod 173 whose upper end is pivotally connected at 175 to a clutch-release lever 176 pivoted at 177 to the casing 96 and suitably guided, as by sliding engagement with the forward one of the flywheel-retaining collars 155a. The lever 176 has a dog-retracting cam cheek 178 urged toward the shaft 100 by a spring 179. The spring 179 also acts through the lever 176 and rod 173 to constantly urge the front or handle end 181 (Fig. 7) of the control lever 170 downward, i. e., to clutch-release position.

The handle end 181 of the lever 170 is held elevated by a detent 182 normally held in place by a spring 183 (Fig. 5).

While the lever 170 is held in the upraised position shown in Figs. 5 and 6, the cheek 178 is held clear of the pawl 161, which establishes a driving connection between the flywheel 155 and the shaft 100. The lever 170 forward of the pivot 171 is preferably of such length and resilience that it may be deflected by the operator sidewise off the detent 182 (Fig. 7), whereupon the spring 179 becomes effective to force the cheek 178 against the shaft 100. It will be observed from Figs. 6 and 8 that between the forward collar 155a and a lug 183 on the dog 161 there is a socket or recess 184 and that the cheek 178 has a tapered cam end 185. The cheek is normally clear of the socket or recess 184. The cam has a point 185a so arranged that, when the cheek is forced toward the shaft 100 following tripping of the lever 176, as the shaft 100 continues to rotate, the point 185a will engage in the socket 184 and the cam surface 185 with the lug 183, whereupon said lug will ride upon the cam surface until the dog 161 is completely withdrawn from the flywheel slot 160, as shown in dotted lines in Fig. 8, thereby stopping the drive from the flywheel so that the machine stops with the lug engaged by the cheek, and the flywheel idles. By raising the handle end of the lever 170 onto the detent 182, the cheek 178 is withdrawn to the position shown in full lines in Figs. 6 and 8, whereupon the spring 164 becomes effective to project the dog 161 into the flywheel slot 160 as soon as the flywheel has revolved sufficiently to bring the slot into line with the dog, thus again driving the machine from the flywheel.

The shaft 101 at the rear of the casing 96 (Fig. 6) has a power take-off sprocket 186 chained at 187 to another sprocket 188 mounted on a shaft 189 extending forward (Fig. 19) adjacent the outer periphery of the turret 117. A connecting rod 190 extends from a crank pin 191 on the shaft 189 to a pin 192 on a bracket 193 secured to a reciprocal feeder and agitator 194 slotted at the top as shown at 194a and movable in guides formed on a stationary slug container 195. The feeder tapers down transversely from the top of its slot as at 194b. The container 195 provides storage for the washer-like or other slugs which may be employed in forming the caps of the finished articles, as will appear.

Inclined downward from the container is a chute 197 having a channel 198 whose depth is preferably slightly greater than the diameter of the slugs so that the slugs may roll freely down the chute. The mouth 199 of the chute communicates with the interior of the container 195. It will be observed that the top of the feeder 194 is inclined at 201 in the same way as the chute 197, and that when the feeder is at its bottom position it is at least partially covered by slugs, as shown in full lines. As the feeder rises, it sheds all except those slugs disposed in its slot, as shown in dotted lines. The feed member 194 at its upper limit of movement is arranged with its top 201 leading to the mouth of the chute 197, so that the slugs gravitate from the top 201 to the mouth and into the chute. In practice, the container 195 is maintained sufficiently full of slugs to enable the reciprocal member 194 to keep the chute plentifully supplied with slugs for the uninterrupted operation of the machine, as will appear.

Secured to the shaft 189 is a combination peripheral and face cam 205 (Figs. 19 and 20). A lever 206 is pivoted at 207 to a stationary part of the structure and has a follower lug 208 which is engageable with the dwells 209 and lands 210 of a face cam 211. The lug 208 is constantly urged into engagement with the face cam by a spring 212, and it will be observed that the lever 206 is given four complete cycles of oscillation for every revolution of the shaft 189.

The upper end 206a of the lever 206 is pivotally connected at 213 to a reciprocal bar 214 slidable in guides 215. The bar 214 is accordingly urged at all times to the left, referring to Fig. 19, by the spring 212. The left or rear end portion 217 of the bar 214 has a notch 218 which, when the bar 214 is substantially in the position shown in full lines in Fig. 19, is in a position to receive a slug from the discharge end 219 of the chute 197. Pivotally connected to the rear end 217 of the bar 214 is a lever 220 having a notch 221 shaped to engage the rear side of a slug disposed in the notch 218, and constantly urged by a spring 222 toward the slug so positioned. It will be observed that the discharge end 219 of the chute 197 projects rearwardly to such an extent, shown at 223, as to provide a stop limiting the forward movement of the upper end 224 of the lever 220. This will explain why, with the bar 214 arranged as shown in Fig. 19, the notch 221 is spaced from the slug received in the notch 118. With the notches 221 and 218 thus spaced apart, the lever 220 at the upper extremity 226 of its notch is spaced from the upper end of the notch 218 slightly in excess of the diameter of the slugs so as to permit a slug to pass freely down from the chute 197 into the notch 218, as shown in Fig. 19.

The structure is so designed that when the follower lug 208 of the lever 206 is in its rearmost position, which occurs when the shaft 189 has rotated to such a position as to locate the lug 208 in the dwell 209 between adjacent face cam lands 210, the lever 206 is in the dotted line position, as are the lever 220 and the rear end 217 of the bar 214. The structure is so designed that when the bar 214 is in its rearmost position, the slug in the notch 218 is axially aligned with a hollow die 119, 120 in the turret 117. The outside diameter of each slug is such as to enable it to be shoved without resistance into the die until the slug is in substantial contact with the boss 123 of the inner die element 120. It will be observed that as the rearward movement of the bar 214 commences, the upper end 224 of the lever 220 will remain in engagement with the stop 223 of the chute 197 until such time as the notch 221 in the lever 220 is engaged by the slug in the notch 218. From that point, as the bar 214 continues rearward, the lever 220 will move rearward from the stop 223 and will be held by the spring 222 against the slug so as to clamp the slug in the notches 221 and 218 between the bar 214 and lever 220, and thereby hold the slug in position to be engaged and thrust by a feeding member into a die in the turret 117 as will appear presently.

Pivotally mounted as at 230 on a bracket extension 231 is a lever 232 having a follower lug or roller 233 constantly urged by a spring 234 into engagement with the external or peripheral cam 235. It will be observed that the cam 235 has the same number of lands 236 and intervening dwells 237 as the face cam 211, and the relative positions of the parts of the two cams are such as to enable the lever 232 to project a feeding plunger or pin 239 preferably adjustably mounted thereon to push each slug into the waiting turret die after the slug is fed to the proper position by the bar 214.

The lever 206 is shown engaged with the far side of the face cam, reference being had to Fig. 19, while the other lever 232 is engaged with the near side of the external cam. Obviously these relationships may be changed in various ways without departing from the principles of the invention, and accordingly it will be understood that the arrangement shown is selected for purposes of illustration and not by way of limitation. Assuming the shaft 189 to be rotating in the direction indicated by the arrow C in Fig. 20, it will be observed that the lever 206 is engaged with the land 210a at the point indicated and the lever 232 is engaged with the opposed land 236a of the external cam. During rotation of the shaft 189 approximately 22½°, the lever 232 remains in its withdrawn position while the lever 206 is moving rearward (to the left as seen in Fig. 19), and at the beginning of the movement of the follower 233 into the dwell 237a succeeding the land 236a the lug 208 has reached the dwell 209a succeeding the land 210a. With the parts thus arranged the bar 214 will be in its rearmost position and the slug supported thereby ready to be shoved into the adjacent die. As the follower 233 enters more deeply into the dwell 237a, the bar 214 holds the slug supported thereby stationary since the lug 208 of the lever 206 is engaged with the flat surface of the dwell 209a. The plunger 239 which may be adjustably mounted on the lever 232 engages the slug 70a and passes between the notches 218 and 221, releasing the slug therefrom and depositing the slug in the juxtaposed die sleeve or collar 119. When the plunger 239 is in its innermost position, the lug 208 is at about the midpoint of its travel along the dwell 209a of the face cam 211. As the follower 233 rides up the dwell 237a toward the next land, the bar 214 remains stationary substantially until the pin 239 has been retracted clear of the notches 218 and 221. Then the bar 214, due to engagement of the lug 208 with the next land 210b, will begin its forward movement, while the pin 239 remains stationary due to engagement of the follower 233 with the next land 236b.

No injury to the plunger 239 could result from this movement even if it occurred before the plunger were clear of said notches, since in moving forward the bar 214 would merely recede from the plunger 239, and the plunger would simply prevent the upper part of the lever 220 from following the bar 214, against the action of the spring 222. The pin 239 is disposed at such a distance from the pivot 230 that its movement is substantially linear for all practical purposes, and sufficient tolerances are afforded to insure proper cooperation of the parts. As the lug 208 approaches the crest of the land 210b, forward movement of the bar 214 continues. The pin 239 remains fully retracted until the bar 214 has again reached its rearmost position, recommencing the slug feeding cycle. Abutments 214a and 220a on the bar 214 and lever 220 limit the approach of the lever to the bar to such an extent as to space apart the walls of the notches 218 and 226 slightly less than the diameter of the slugs to insure proper pressure of the lever on each slug in the notches, and slightly more than the diameter of the plunger 239 so that in the event no slug is deposited in said notches the plunger will pass between said walls and thereby avoid injury to itself and the lever.

The levers 206 and 232 and associated cams are in properly timed relation to one another and to the turret and die operating mechanism. For each revolution of the shaft 189, four slugs may be fed into successive dies on the turret. The sprocket 188 is shown four times as large as the sprocket 186, so that the turret will be indexed four times for every revolution of the shaft 189, and thus the operation of the slug feeding mechanism is maintained in properly timed relation to the indexing of the turret. The ratio of the sprockets and the number of indexings of the turret per revolution of the shaft 189 may be varied as desired.

A connecting rod 246 extends from a crank pin 245 (Fig. 6) on the shaft 189 to a container and supplier 247 of nails 248 to be capped. The container has a channel 249 to receive the shanks 248a of the nails, the nail heads 248b resting on the upper surfaces 250 at opposite sides of the channel. The container has an extension pivotally connected at 252 to a stationary chute 253 mounted as by brackets 254. The chute 253 comprises spaced walls 255 forming the sides of a channel 256 (Fig. 10) which is a continuation of the channel 249 in the container 247. The container 247 is oscillated about the pivot 252 a complete cycle for every revolution of the shaft 189, the speed of rise being held down sufficiently to insure against throwing any nails out of the box or container 247. In a machine in operation embodying this invention, shown on the drawings, applicant found it expedient to oscillate the container once for every four revolutions of the shaft 100, but it will be appreciated that this may be varied as the conditions may require or suggest. Each time the container 247 rises, a sufficient or excessive number of nail shanks find their way into the channel 249, and when the container is in an upper position the nails gravitate into the chute 253. There are at all times on hand sufficient nails for the continued operation of the machine, the attendant being careful of course to keep the container 247 well stocked. The container could be covered, but this is not preferred because an open container is always in condition to receive additional supplies. It is additionally advisable to take precautions against too precipitate a rise of the container 247 in order to give the nails an opportunity to pass from the container to the chute 253.

At the rear of the casing 96 (Fig. 6) a tube 260 is connected to a crank pin 261 supported by the shaft 99, and telescopically received in the tube is a rod 262 having a collar or head 263 between which and the tube 260 a spring 264 is under compression. At the opposite end of the tube the rod is provided with another collar 265 which limits the outward movement of the rod relative to the tube. The rod 262 carries at its other end a rack 266 which is meshed with a pinion 267 integral with or keyed as at 268 (Fig. 10) to a sleeve or collar 269 rotatably carried by a shaft 270. The rack 266 is disposed at all times within a saddle 271 pivotally mounted on the shaft 270 to maintain the meshed relationship irrespective of the position of the rack. A pawl 272 may be pivotally mounted as at 273 on a ring 274 rotatable with the shaft 270, and is urged by a spring 275 into a notch 276 in the collar 269.

The eccentricity of the crank pin 261 may be such that for every stroke imparted thereby to the rack 266 the pinion 267 will make a complete revolution. The arrangement shown is such that the driving stroke of the rack occurs with the upward movement thereof so that, referring to Figs. 6, 10 and 11, it will be observed that the rack 266 has substantially completed a driving stroke. During this stroke, the pinnion 267 turns the collar 269 in the direction indicated at D in these figures, driving the pawl 272 which, through its connection 273 with the ring 274, drives said ring and consequently the shaft 270. During the next half-revolution of the shaft 99, whose direction is indicated at E, the rack 266 will move downward and turn the pinion 267 one revolution in the direction opposite to that indicated at D. A pawl 277 pivoted at 278 to the casing 96 or other stationary part is urged by a spring 279 into a notch 280 in the ring 274 and is so arranged as to be snapped into said notch at the end of each driving stroke of the rack 266 and consequent revolution of the ring and shaft 270, thereby preventing retrograde movement of the shaft during the return stroke of the rack, pinion and sleeve 269. During such return, the sleeve 269 overruns the pawl 272 for one revolution, at the end of which the rack has completed its return stroke and the pawl 272 engages in the notch 276, prepared for the next driving stroke of the rack.

The shaft 270 is supported in bearings 285 and 286 between which the shaft has the form of a worm 287 whose thread 288 is preferably substantially square cut although other shapes may be suitable. The chute 253 has its discharge end turned forward adjacent the worm. One turned wall 289 of the chute is undercut as at 298, leaving a nail-head supporting bar or ledge 290a which overlies a part of the worm. The opening 290 enables the shanks of the nails supported by said ledge to hang aslant against the adjacent side of the worm. The other turned wall 291 extends adjacent the wall 289 but more remote from the worm 287, and its ledge 291a assists the ledge 290a in supporting the heads of the nails. The inclination of the chute 253 assures the gravitating of the nails toward the worm.

The space 292 between consecutive convolutions of the worm is of a width to receive only one shank 248a. The thread, rotating in the direction indicated by the arrow D, has a rising motion adjacent the shanks and progresses the shanks toward the front of the machine, as indicated by the arrow F in Fig. 10. Adjacent the undercut 290 a corner portion of the thread facing the rear is beveled as at 293. This bevel is so located that its rotatively advance end 293a first engages a shank 248a as the shank enters the undercut 290 and leans against the worm (Fig. 12).

As the rotation of the worm proceeds, the shank gravitates forward and during this time it engages progressively forwardly located portions of the bevel surface 293, which accordingly eases the shank further into the thread groove 292 (Fig. 13). When the shank is fully deposited, which is at about the point where the trailing end 293b of the bevel 293 leaves the shank, the shank may be still inclined. From this point forward the chute wall portion 291 approaches the vertical. Presently the wall 291 is reduced in height as at 291b so that the forwardly progressing nails gravitate until their points rest on a floor or base bar 294 and slide forwardly therealong, supported in elevated positions by the worm and the wall portion 291 for at least part of the travel. The portion 291 may terminate at the forward end of its incline 291b and may be fastened as at 295 to a wall extension 296 secured as at 297 to the base 294.

The rear bearing 285 may comprise an arm 285a projecting up from the base 294 and slotted to receive preferably non-rotatably a bearing collar 285b held in place as by set screw means 285c. The front bearing 286 receives the journal extension 286a whose outer end is threaded and receives a nut 286b suitably held in place as by a set screw 286c. Thus removal and replacement of the worm are facilitated. Worms of different pitches may be employed to accommodate different sizes of articles to be capped.

With this construction a new nail is introduced and all nails progress forward a distance equal to the pitch of the worm, upon each revolution of the worm. The revolutions of the worm are intermittent, the worm being ratchet-controlled and deriving its motion from the rack 266 as has been explained. Since the portions of the worm engaging the shanks move toward the heads of the nails, bent and other malformed nails will not be progressed but rather will be raised off the chute by the thread of the worm and will fall on the opposite side of the worm out of harm's way, the worm moving downward at said opposite side.

The wall 296 may terminate at the forward end 298 of the worm and adjacent a block 299 which may be connected to the base 294 by any suitable means 300. The front end of the worm is disposed at the front of the casing 96 and over the turret 117, and the block 299 has a U-shaped notch 301 arranged to receive the nails discharged by the worm. The block 299 extends to such a height above the base 294, and the notch 301 is so dimensioned, that the wall of the notch 301 is engageable with the head of each nail leaving the worm.

The base 294 has a belled guide hole 302 which is reached by the points 248c of the shanks as they are discharged by the worm (Figs. 10, 15, 21, 22 and 23). This hole terminates downwardly in a slot or notch 303 in the bottom of the base 294. Pivoted as at 304 in the slot 303 are the jaws 305 of a clamp 306. The clamp jaws are urged together by a spring 307 and have complemental part-circular bevel countersinks 308 arranged so that when the jaws are together they provide a generally conical surface which each nail point 248c strikes and by which the point is guided to the apex thereof, where the jaws are recessed at 309, forming, when together, a generally circular hole 310 of a size to permit only the extremity of the point to be projected therethrough by gravity, as shown particularly in Fig. 15. Hence when the nail's progress by the worm is completed, the point will have slid by gravity down to the bottom of the countersinks to protrude slightly through the hole 310. The body of the nail, due to this last thrust by the worm, moves free of the worm so that the nail is now supported by engagement of its head with the wall of the notch 301 and by engagement of the nail point with the closed clamp jaws 305. Upon this delivery of the nail by the worm, the worm commences its pause, and the nail feeding pin 115 descends, engaging the head of the nail, and forcing the nail down, first spreading the clamp jaws slightly as determined by the diameter of the nail shank (Fig. 16), then more fully as determined by the diameter of the nail head (Figs. 17 and 18), and then placing the nail head on the bottom of the slug in the die, as will appear. The pin 115 thereafter is of course raised sufficiently to avoid interference with delivery of the next nail by the worm.

The clamp 306 and the wall of the belled hole 302 serve not only to help position the nail for the feed by the plunger 115 but also to guide the nail point into the waiting die therebelow (Figs. 21 and 23). When the feed plunger 115 is sufficiently retracted, the clamp jaws 305 are snapped together by the spring 307 to the relation shown in Figs. 9, 10, 14, 15 and 21, prepared for the feed of the next nail.

I will now describe the capping of the headed articles. It will be recalled that the machine of Fig. 1 forms slugs which, after being removed from a tumbler (not shown) in which they may receive a coat of graphite used in the tumbling operation, are deposited in successive dies in the turret 117 at any suitable point such as the station 315 (Fig. 21) before such dies reach the first slug-deforming punch or die plunger 105. After being tumbled, the slugs 70a appear substantially as shown at said station, tapered within at 70a' because of the shape of the pilot 50 (Fig. 1), but this shape is immaterial as far as the capping is concerned. Accordingly, although the slug 70a shown about to be deposited in Fig. 21 has its reduced side innermost, that is purely a matter of chance as either end may first enter the die. At 316, for example, the slug 70a is shown with its large side innermost.

The place of deposit of the slugs may be in any desired proximity to the first die plunger or punch 105, and each slug is then indexed to the station 317 to receive said plunger. It will be observed that this plunger or punch has a pilot 318 (Figs. 21 and 22), shaped to pass slidably into the bore 124 in the boss 123 of the die member 120. The minimum diameter of the hole 70a' is preferably such as to insure against shearing of any part of the slug by the pilot. However, should there be any excess slug material in the path of the pilot, it will shear the same off and the chip will escape through the bore 124 and the turret hole 118a. The body portion 319 of the punch 105 is of a diameter preferably only slightly exceeding that of the nail heads, and substantially smaller than the bore of the die sleeve 119, but large enough to upset the slug upon descent of said punch. The punch is preferably sufficiently slender and resilient to yield laterally somewhat in case of any accidental axial disalinement between the punch and the bore 124, and it will be observed that the chamfered die edge 128 under such circumstances will guide the pilot 318 into the bore. The body portion 319 of the punch stops short of the top of the die boss 123 and, in cooperation with the pilot 318, presses the relatively soft material of which the slug is made into a cup 320 whose outer wall or skirt takes its shape from the wall of the sleeve bore 121 and whose bottom takes its shape from the top of the die boss 123, and which now has an annular base 321, a hole 323 of substantially the same size as, and registered with, the bore 124, and a cylindrical skirt 322.

Upon retraction of the punch 105, the cup 320 might tend to be pulled out with the punch. This is guarded against by the provision of a stripper 324 secured as at 324a to the casing 96 or other suitable support. The stripper has a hole 324b of smaller diameter than the cup to prevent its rise out of the die, and of sufficient size to allow the punch 105 to pass readily therethrough. The turret is now indexed to bring the next slug to a position to receive the punch 105 as just explained, the preceding slug, now in the form of the cup 320, stopping at the next station 325, where the plunger 115 feeds a headed element 248 into the waiting die and cup, the head of said element coming to rest on the base of the cup 320 therein and the shank of the element extending through the hole 323 in the cup.

After the plunger 115 is withdrawn from the turret 117, the latter is indexed to bring the nail last mentioned to the next station, 327. The punch 106 at this station is of a diameter to have a sliding fit in the bore 121 of the die sleeve 119, the inner upper edge 121a of which is preferably chamfered and the punch having sufficient lateral yield to be guided into said bore if for any reason there should be a slight axial disalinement between said bore and punch. The free end 328 of the punch 106 has a cavity 329 from whose inner end 330 a vent and spew hole 331 extends upward and transversely to the exterior of the punch. The stroke of this punch is such that its extremity stops short of the head of the nail as seen in Fig. 22. The cavity 329 is of such volume that each slug, when pressed by the punch 106, will at least fill said cavity. Should there be any excess of slug material, it will escape through the hole 331, which also serves as a vent for the escape of air which otherwise might be trapped in said cavity and affect the shape of the cap to be formed. When the punch 106 is withdrawn, it tears any excess slug material, as indicated at 333, off the top of the punch material, now in the rough form of an enclosure 334, leaving a rough or broken spot at the upper part of the enclosure. The excess material may escape into a suitable bin (not shown) to be collected for reuse in the kettle 54 (Fig. 1) if desired. The casting equipment for the slugs may be so designed as to practically avoid production of slugs of excess volume. However, in order to assure that they have sufficient volume, it may be advisable to make them slightly oversize.

The turret is now indexed again, bringing the enclosure 334 to the next station, 336 to be pressed by the punch 107. This punch has a sliding fit in the bore 121 of the die sleeve 119 and is preferably capable of slight lateral give so as to be piloted by the sleeve chamfer 121a into the bore 121, should for any reason there be any disalinement therebetween. The free end 337 of this punch has a cavity 338 of any suitable shape which it may be desired finally to impart to the top of the cap to be formed. The design is such that when the punch 107 comes to rest within the bore 121, preferably at a slightly higher point than the punch 106, the cap material will be pressed by the punch 107 to form the cap 129 smoothly crowned as at 129a, and shown in detail in Figs. 24 and 25. Since the quantity of material with which the punch 107 has to deal can never be excessive, due to the escape provided at 331 in the punch 106, it follows that with this construction all of the caps will be substantially uniform. Since here the cap material first engages the uppermost part of the cavity wall and, as the punch 107 continues to descend, gradually lower parts of the cavity wall become engaged with the material, the air in the cavity is gradually forced downward to escape between the die collar and the outside wall of the punch 107.

Upon retraction of the punch 107, the turret is again indexed. Any suitable means may be provided for ejecting the finished articles. In the illustrated embodiment of my invention, this is done by applying a force to the point of the article and pushing toward its cap 129 until the cap is clear of the die, as will be seen in dotted lines in Fig. 21. The ejection may be effected at any suitable station after completion of the capping operation. Such station is preferably diametrically opposite any of the aforementioned plunger stations, as at 340, so that an ejector bar 341 (Figs. 5 and 21) suitably connected as by a bracket 341a to the head 103, for example, carrying the punch 105, operates upon each descent of the punch to knock out a capped article and is retracted with the head for the next operation. The bar preferably carries a spring-pressed plunger 342 which pushes the nail points. A chute 343 may be disposed to receive the ejected articles and convey them to kegs or other containing means (not shown).

Thus it will be observed that upon each working movement of the plungers 239, 105, 115, 106, 107, and 341, which operate simultaneously, a slug is fed to the turret by the pin 239, a previously fed slug is formed into a cup by the punch 105, a nail or other element 248 is deposited by the ram 115 into a previously formed cup, a previously deposited element is rough-capped by the punch 106, a previously rough-capped article is finish-capped by the punch 107, and a previously finished article ejected by the bar 341. With respect to each article, each of these treatments occurs in the order given, and upon each operation a finished article is formed and discharged, emptying the dies so that they may again be loaded at the station 315.

If, from lack of supply or for any other reason, no slug is fed to the turret, provision is made to stop the machine. To this end, referring to Fig. 5, the bracket 341a carries a member 345 which may be in the form of a U-bar slidably supporting a rod 346 in its arms. The rod 346 carries an electric contact 347 which is yieldably urged by a spring 348 into engagement with an electric contact 347' carried by the bar 345. The contacts are suitably insulated, and a wire 350 may connect one of the contacts, as the contact 347', to the line as indicated at 351. A wire 352 from the contact 347 is connected to another contact 353 carried by and insulated as at 354 from any stationary part, such as the guide 104 in which the head 103 carrying one of the cap-forming punches, as for example the punch 107, is reciprocal. A contact 353' is carried by and insulated as at 355 from said head, and a wire 356 connects the contact 353' to one end 357 of a solenoid coil generally indicated at 358, the other end 359 of which is connected by a wire 360 to the line as at 351. Now it will be observed that I have just described a series circuit which is closed when the contacts 347 and 347' engage each other while the contacts 353 and 353' are engaged with each other.

The coil 358, when energized, is operative to pull upon an armature 362 which may be pivotally connected as at 363 to the detent 181 adapted to be held out by the spring 183 to support the control lever 170 in operative position as previously explained.

When the punch 105 descends, the bar 345 carries the rod 346 therewith, and the spring 348 holds the contacts 347 and 347' together until the spring pressure is overcome. The rod 346 is arranged to enter a die between the stations 315 and 317. If a slug 70a has been fed, the rod will be stopped by the slug as shown in dotted lines at 346' in Fig. 5, substantially before the end of the working stroke of the plungers. The bar 345 continues for the full stroke, however, so that for a period at the end of the working stroke, and at the beginning of the return stroke, the contacts 347 and 347' are apart as shown in dotted lines at 347a and 347a'. This separation is designed to be effective during the period of engagement of the contacts 353 and 353', which engagement is of shorter duration, commencing nearer the end of the working stroke and ceasing nearer the beginning of the return stroke. Consequently insofar as the slug feed is concerned, when a slug is fed the circuit is open and the machine continues to operate.

However, if no slug is fed, there will be nothing to obstruct the rod 346 during the working stroke, so that the contacts 347 and 347' will be interengaged when the contacts 353 and 353' kiss. This closes the solenoid circuit and immediately the solenoid pulls the armature 362 against the action of the spring 183, moving the detent 182 to its inoperative position 182', whereupon the spring 179 (Fig. 6) throws the clutch release cam cheek 178 toward the shaft 100 for the purpose of releasing the clutch by which the machine is driven, as has been explained. These events take place in the sequence related, but the cam cheek is engaged with the shaft 100 at substantially the same moment when the solenoid circuit is closed.

Referring to Figs. 5 and 23, it will be observed that an electric contact 364 is carried as by a piece of insulation 365 preferably pivoted at 366 to insulation 367 mounted on any suitable stationary part 367a as at the bearing 286 at the front of the worm. The contact 364 is connected by a wire 368 to the wire 352 and thence to the contact 353. Another contact 364' may be carried as by the insulation 367, and a spring 369 (Fig. 23) yieldably urges the contact 364 into engagement with the contact 364', as they appear in Fig. 5. A wire 370 connects the contact 364' to the wire 350 and thence to the line at 351. It is thus evident that I provide a series circuit including the solenoid 358, the contacts 353 and 353', and the contacts 364 and 364'.

This circuit is controlled similarly to the first described circuit. It will be noted that the piece 365 has a lever arm 371 which is urged by the spring 369 into elevated position as shown in dotted lines in Fig. 23, to hold the contacts 364 and 364' engaged. The arm 371 is in the path of the nail point and is so located that when a nail is fed, its point depresses the arm 371, separating the contacts 364 and 364' before the contacts 353 and 353' kiss. As the plungers ascend, the contacts 353 and 353' separate before the receding nail feed ram 115 gives the spring 369 an opportunity to reengage the contacts 364 and 364'. Thus as long as nails continue to be fed into the dies the solenoid circuit remains open and the machine continues to operate.

In the event no nail is deposited by the ram 115, the contacts 364 and 364' will remain engaged and, as soon as the contacts 353 and 353' kiss, the solenoid circuit becomes closed and causes the clutch release cam cheek 178 (Fig. 6) to be moved by the spring 179 toward the shaft 100 preparatory to release of the clutch by which the machine is driven from the flywheel.

Thus it is apparent that I have provided a series-parallel combined circuit in which the pair of contacts 347, 347' is in parallel with the pair of contacts 364, 364' and each of these pairs is separately in series with the pair of contacts 353, 353', the solenoid 358 and the line 351. When no slug is fed, the contacts 347, 347' will be together when the contacts 353, 353' kiss, energizing the solenoid. When no nail, or other element to be capped, is fed, the contacts 364, 364' will be together when the contacts 353, 353' kiss, energizing the solenoid. When both slug and nail are fed without interruption the solenoid remains unenergized and the machine operates without interruption as long as desired.

It will be observed that the solenoid becomes energized, and because of the solenoid the cam cheek 178 is thrust against the shaft 100, only at the end of the working stroke of the plungers, when the plungers are disposed in the various dies in the turret 117. It is desirable that the machine stop when the plungers are up, clear of the turret. The clutch dog 161 is mounted on the shaft 100 in such position as to be substantially diametrically opposite the cam cheek 178 when the latter reaches its clutch-release position, shown in dotted lines in Fig. 8, at which time the plungers are down, so that in another half turn, when the plungers are up, the dog 161 will be retracted from the flywheel slot 160 by the cheek cam 185, as shown in dotted lines in Fig. 8, whereupon the machine stops and the flywheel idles. The solenoid is energized only for a moment, because when the plungers rise the contacts 353 and 353' become separated. The spring 183 then pulls out the armature 362 and presses the upper end of the detent, shown dotted at 182' in Fig. 5, against a side of the control or trip lever end, shown dotted at 181' in Fig. 5, where said detent remains inoperative until the machine is restarted.

The stopping of the machine will apprise the attendant of the fact that replenishment of slugs or nail blanks or both is necessary. If an individual slug or nail blank was not deposited, he can place them in the corresponding dies by hand since the plungers are clear. When it is desired to restart the machine, the attendant raises the end 181 of the lever 170, and thereby, through the link 173 and lever 176 and against the action of the spring 179, retracts the cam 185 from the socket 184 of the clutch dog 161, which is then thrust by the spring 164 against the side of the revolving flywheel provided with the slot 160. As soon as the slot is alined with the dog, the latter enters the slot, the clutch is thus engaged, and the machine is driven again.

The machine may be stopped at will by the operator. All he need do is strike or otherwise move the end 181 of the lever 170 sidewise, as will be understood from Fig. 7, so as to cause the lever to clear the detent 182, whereupon the spring 179 will shift the clutch-release cheek cam 178 to a position where it is effective to retract the dog 161 from the flywheel slot 160. Here, again, it will be observed that the dog cannot be retracted until it is adjacent the cheek, as seen in Figs. 6 and 8, and when this relation obtains, as has been explained, the plungers are up, clear of the turret dies, so that the dies and the plungers may receive proper attention.

The machine may be restarted as has been explained.

The graphite film on each slug provides adequate lubrication for the dies and cooperating punches, and little effort is required to be exerted by the plunger 341 to eject the capped articles. The caps of the finished articles have the film shown in exaggerated thickness at 134 in Fig. 25 and the film imparts a shiny smooth surface to each cap. This film assists in maintaining the seal against entry of moisture between the cap material and the corrugated or other roofing member fastened by the article.

The term "nail" is used herein for convenience and is to be understood as connoting any blank article capable of being capped in accordance with the invention. Suitable replacements and adjustments may be made as will be apparent to those skilled in the art, when it is desired to form caps of various sizes on nails of various sizes.

Figs. 26, 27 and 28 show a modified slug forming and feeding construction, comprising a stationary anvil 375 to which is fastened or integrally united a ledge 376. Slidably supported on the lower step 377 of the anvil is a bar 378 pivotally connected at 379 to a cross-head (not shown) reciprocal by any suitable means (not shown). A tube 382 terminating in an attaching flange 383 secured to the ledge 376 is formed to hold preferably in columnar fashion a plurality of balls 384, or other shaped masses, of capping material. The ledge 376 has a notch 385 whose wall is arcuate but less than semi-circular, and this notch is in register with the interior wall 387 of the tube. The ledge 376 has two more such notches 388 and 389, the space between the notches 385 and 388 being the same as that between the notches 388 and 389, and said space being equal to the stroke of the lever bar 378.

The bar 378 has a pair of bell shaped or U-shaped notches 391 and 392, the bights of which are semi-cylindrical and adapted to be juxtaposed to the notches in the ledge 376 in such arrangement that each bight is coaxial with the juxtaposed notch in the ledge, as will be seen in full lines especially in Fig. 26.

When the bar 378 is in its fully retracted position, its notch 391 is registered with the ledge notch 385, and the bar is yieldably held against the ledge by a spring 39'. These registered notches receive a ball 384, and it will be noted that the bar 378 is of a height substantially equal to or slightly greater than the height of the ball, which rests on the anvil 375. Now when the pivot 379 moves to the right as seen in Figs. 26 and 28, the left wall of the notch 391 pushes the ball against the right part of the notch 385, which cams the ball away, forcing the bar 378 away from the ledge 376 against the action of the spring 395. As the movement of the pivot 379 proceeds, the ball is trapped between the side 396 of the ledge and the bight of the notch 391 and is advanced with the latter until the ledge notch 388 is reached, when the spring 395 snaps the ball into the ledge notch 388. The lever bar 378 now pauses, and during the pause a punch 398 descends and flattens the ball into a cup 399, whose outer surface is shaped to correspond with the wall of the arcuate notch 388 and the wall of the bell notch 391.

Promptly after the forming of the cup 399 and while the punch 398 is still engaged with the cup, the bar 378 is retracted. The cup and punch engage the right side of the wall of the notch 391 and cam the bar 378 away from the ledge 376 against the action of the spring 395, and accordingly the bar 378 is retracted without disturbing the cup, said bar sliding under the lowermost ball in the tube 382, until the notches 385 and 391 are again registered. At this time, the notch 392 is registered with the ledge notch 388, a ball drops in the notches 385 and 391, and the spring 395 snaps the bar against the ledge. The bar 378 is now at the end of its return stroke, and the punch 398 is raised clear, a suitable actuating means, such as that for the punch 105, being provided therefor.

Upon the next working stroke of the bar 378, the ball in the notches 385 and 391 is carried to the right in the notch 391 as explained above, and at the same time the cup 399 is similarly forced out of the ledge notch 388 and moves in the notch 392 to the right with the bar 378. At the end of this stroke, the ball is deposited in the ledge notch 388, and the cup 399 is deposited in the ledge notch 389 over the belled or flared hole 400 in the anvil 375, the corners 401 of the cup holding the cup on the surface 377 of the anvil 375. The hole 400 is preferably round and of the same diameter as the notches aforesaid. Now upon descent of the punch 105, the corners 401 are pressed inward by the bell mouth of the hole 400, and the resulting cup deposited in the waiting turret die at the station 402, and the punch squeezes the cup into the shape shown at 320, the pilot 318 punching a hole in the bottom of the cup. The die bore is preferably flared at its bottom to facilitate escape of chips. The bar 378 is held in place by a guide 403 carried as by the support for the punch 105. After the ascent of the punch 105, the turret is indexed and the bar 378 is retracted as before. To prevent pulling out of the cup 320 upon retraction of the punch 105, I provide a stripper which may comprise spring pressed jaws 403 pivoted as at 404 in a slot 405 in the anvil 375, the jaws spreading upon descent of the cup 399 and punch 105 and then snapping together to prevent withdrawal of the cup 320 while permitting return of the punch.

Thus upon every working stroke of the bar 378 a ball is transformed into a cup-like slug and the latter deposited and perforated in the turret which is then indexed to permit the ram 115 to insert a nail 248, and the cap forming punches 106 and 107 to operate, as has been explained.

Fig. 29 shows a somewhat modified construction differing from that of Figs. 26, 27 and 28 substantially only in that the anvil 375a has another hole 406 disposed in coaxial relation to the ledge notch 388 and a punch 398a has a pilot 407 to form from each ball 384 at one operation a slug in the shape of a washer 408. This washer is advanced in the manner above explained to the station 402, where the punch 105 operates as before.

In the form shown in Fig. 30, a stationary tube 410 supports a rod or wire 411 of capping material of the cross-sectional shape of the slugs to be used. The rod is alined with successive dies upon each indexing of the turret 117, and upon each alinement of the rod with a die, the rod is fed the thickness of a slug into the die as shown. Then this material is sheared off as the turret turns, forming the slug 412 which thereafter receives the aforesaid succession of plungers for forming capped articles, suitable stripping means, such as the stripper 324, being employed.

In Fig. 31, a channel 414 carries preformed slugs 412 in a series, and if desired may have a cover 414a. When each slug has progressed to the station 415, it is pushed by a plunger 416 through an opening 417 in the web of the channel and into the waiting die in the turret 117. This slug then receives the above-described succession of plungers for forming the capped article, suitable stripping means, such as the stripper 324, being employed.

The collar 119 of each die has outer inclined surfaces 426 and 427, and for each die the turret has a screw 428 whose point is substantially smaller than the height of each surface and arranged to engage each surface, depending on which is facing the outer end of the turret die hole 118, to exert a camming force serving to press the die inward toward the bottom of said hole. The surfaces may be formed by filing, milling or in any suitable way, and they could conveniently be the sides of a circumferential V-groove.

Each die may be slipped into the turret and may be removed from the turret by loosening the set screw and pushing on the bottom of the die member 120 radially outward with a wire or other means inserted in the associated hole 118a in the turret.

The collar 119 is reversibly assembled with the die member 120, and is preferably of less length than the boss 123 so that when the collar is reversed no portion of the worn interior thereof will appear above said boss.

An important feature of my invention lies in the two-piece die construction. To make the die in one piece would involve the difficult task of machining a groove or making a sharp corner at the juncture of the boss and collar upstanding therefrom. In accordance with my invention the boss is very easily rabbeted at 127 or it may be chamfered or given any other desired shape, by machining or otherwise. Both the inside of the collar and the exposed portions of the top of the die boss 123 may be separately and easily polished to the desired degree. After they are suitably hardened they are telescoped together preferably with a force fit. In this way the juncture of the inner surface of the collar with the boss 123 may be as sharp and the adjacent surfaces as uniformly and smoothly polished as desired. The parts may be separated to reverse the collar for placing in service the other end thereof. Thus, in the event one part becomes defective, only that part, and not the whole die, need be replaced.

It will be observed that with my invention the cap metal or other material is formed into a cup in the very die in which it is pressed into a cap about the head of the nail. The cup-forming punch may be adjustably supported to vary the thickness of the bottoms of the cups, and this thickness will determine the thickness of the remainder of the cap about said head since, as has been explained, the amount of cap material for each cap is fixed. Accordingly the thickness of all parts of the cap may be substantially uniform if desired.

The nail head is automatically rotated in proper relation to the cap material by virtue of the fit of the skirt of the cup about said head. The form of cap may be varied. For certain fastenings such as those used in connection with roofing construction, to provide an adequate seal it is desirable that the cap completely cover the head and part of the shank, as illustrated.

Certain of the nails illustrated have lugs 248d which serve to interlock with the cap and prevent the latter from becoming loose in service. However, the invention is fully applicable to other shapes of heads as is obvious to those skilled in the art.

It will be appreciated from the foregoing that I have provided efficient means for expeditiously and economically producing slugs, either by casting or by pressing, and capped articles by pressing. The various mechanisms employed are substantial, compact and rugged, and produce capped articles finished in appearance and highly efficacious in use.

I am aware that many changes may be made and details of construction varied through a wide range without departing from the principles of my invention, and I therefore do not purpose limiting the patent granted hereon otherwise than as necessitated by the prior art.

I claim:

1. An apparatus for applying caps to the heads of headed elements, comprising a turret mounted to rotate about a substantially horizontal axis, said turret including a peripheral flange having a circumferential series of substantially radial holes therethrough, a cup-like die mounted in each hole and having a reduced bore therethrough communicating with said hole to receive the shank of an element, means for indexing said turret through the angle between successive dies, a plunger for depositing a soft metal mass in the die, a second plunger engageable in each die when the die has been indexed past the first plunger, and formed to cooperate with said die in pressing the mass into cup shape, a third plunger disposed, when the turret has been indexed to locate said die past the second plunger, to deposit a headed element, shank foremost, into the die until the head of the element is in the cup-shaped mass and rests on the base of the cup-shaped mass, a fourth plunger cooperative with said die and having a cavity in its end and disposed, when said die has been indexed past said third plunger, to press the peripheral wall of the cup-shaped mass into a cover for the top of the element head, said fourth plunger having a relatively small vent extending transversely therethrough to the upper part of the cavity for the escape of air and excess cap material and stripping such excess from the cap upon separation of the fourth plunger from the die, a fifth plunger cooperative with said die and having an end cavity and disposed, when said die has been indexed past the fourth plunger, to press the cap material into final crown shape, means movable with one of said plungers and disposed within the flange beyond the fifth plunger for ejecting the capped element outwardly from the die when the turret has been indexed to such an extent that the element is substantially inverted, means including a member engageable in a die between the first and second plungers and operative in the absence of a mass from the last mentioned die to stop the turret and plungers with the plungers clear of the turret, and means for stopping the turret and plungers with the plungers clear of the turret upon the failure of the third plunger to feed an element.

2. In an apparatus for applying lead or other soft metal caps to nails and other elements, a cup-like die adapted to support therein a soft metal mass and having a hole in its base, a punch of substantially less diameter than the interior of the die, means for effecting relative approach of said die and punch to impart a cup shape to the mass, means for depositing a headed element, shank foremost, in the cup-like mass and die, and a punch shaped to have a sliding telescopic fit in said die for pressing the skirt of the cup-like mass into a cap covering the head of the element.

3. In an apparatus for applying lead or other soft metal caps to nails and other elements, a cup-like die adapted to support a soft metal mass and having a hole in its base, a punch of substantially less diameter than the interior of the die, means for effecting relative approach of said die and punch to impart a cup shape to the mass, means for depositing a headed element, shank foremost, in the cup-like mass and die, a punch shaped to have a sliding telescopic fit in said die for pressing the skirt of the cup-like mass into a cap covering the head of the element, the second punch having a vent for the escape of air and excess cap material, said vent being disposed so that such excess will be torn from said cap upon separation of said second punch and die, and a third punch having a telescopic fit in said die and formed to press said cap into finished shape.

4. A capping apparatus of the class described, comprising a support for dies, means for supplying cap material slugs to said dies, said means comprising a pair of jaws resiliently urged together and being separable to provide therebetween a recess adapted to accommodate a slug, a chute containing a row of slugs and having its exit adjacent said jaws, means for moving said jaws to locate said recess in position to receive a slug and then to locate the slug in line with a die, means for holding said jaws apart to receive the slug and for thereafter releasing said jaws to enable said jaws to resiliently clamp the slug therebetween, reciprocal means operative to thrust the slug from said jaws into the die, and means for indexing said support and reciprocating said jaws and thrust means in timed relation to feed slugs to successive dies.

5. In an apparatus of the class described, an inclined chute supporting a row of headed elements, a worm at the discharge end of said chute and having its convolutions spaced apart so as to accommodate the shanks of individual elements in one of the spaces, means for rotating the worm in such direction that the portions thereof adjacent the shanks move toward the heads of the elements, and means engageable with the free ends of said shanks for supporting the elements in the spaces while the elements are progressed by the worm.

6. In an apparatus of the class described, a support for headed elements to be capped, a conveyor worm having its convolutions spaced apart so as to accommodate the shanks of individual elements in successive spaces, said support having an exit arranged to discharge the elements one by one into a worm space, means for intermittently rotating said worm sufficiently to advance one element and receive another element during each movement of the worm, a turret having capping dies, means for indexing said turret in timed relation to the intermittent drive of said worm, and means for depositing into successive turret dies the elements discharged by said worm.

7. A capping apparatus of the class described, comprising a turret having dies, means for feeding slugs to successive dies, a reciprocal punch for operating on each slug, a common drive for the turret, feeding means and punch, a clutch controlling said drive, electric clutch-release means including a circuit and operative when the circuit is closed, said circuit comprising a pair of separable contacts yieldably held together, and separable by engagement of a member supporting one of said contacts with a slug in a die at the close of the working stroke of said punch so as to separate said contacts, said contacts being reengageable during the return of the punch, a pair of contacts disposed to kiss after the first contacts are separated, and to separate before the first contacts are reengaged, so that said clutch-release means is inoperative during uninterrupted feed of the slugs, said first contacts remaining interengaged without interruption in the event no slug was deposited in the die so that when the second contacts kiss, the circuit is closed, said clutch-release means thereupon operating to release the clutch.

8. A capping apparatus of the class described, comprising a turret having dies, a reciprocal plunger for feeding articles to be capped to successive dies, a common drive for said turret and plunger, a clutch controlling said drive, electric clutch-release means including a circuit and operative when the circuit is closed, said circuit comprising separable contacts yieldably held together and separable by engagement of a member supporting one of said contacts with an article in a die at the close of the working stroke of said plunger, so as to separate said contacts, said contacts being reengageable during the return of the punch, a pair of contacts disposed to kiss after the first contacts are separated, and to be separated before the first contacts are reengaged, so that said clutch-release means is inoperative during uninterrupted feed of the articles, said first contacts remaining interengaged without interruption in the event no article was deposited in the die so that when the second contacts kiss the circuit is closed and said clutch-release means operated.

9. A capping machine of the class described, comprising a support having dies, means for feeding slugs to successive dies, a reciprocal punch for operating on each slug in a die, a reciprocal plunger for feeding articles to be capped to successive slug-containing dies, a common drive for said support, slug-feeding means, punch and plunger, a clutch controlling said drive, electric clutch-release means, and a pair of circuits independently controlling said clutch-release means, one circuit comprising contacts yieldably held together and separable by engagement of a member supporting one of said contacts with a slug in a die at the close of the working stroke of said punch and at the start of the return stroke of said punch, the other circuit having a pair of contacts cooperating likewise with an article in a slug-containing die, a pair of contacts in each circuit and disposed to kiss and separate while the aforesaid contacts of each circuit are apart, so that said clutch-release means is inoperative during uninterrupted feed of the slugs and of the articles, said first contacts of each circuit remaining engaged without interruption in the event no slug or no article is deposited, so that when the second contacts of each circuit kiss, one or the other circuit is closed, operating said clutch-release means.

10. A capping machine of the class described, comprising a support having dies, slug-feeding means therefor comprising a container for balls or other masses of capping material of substantially uniform volume, means movable intermittently for receiving the masses one by one from the container, means for pressing each received mass into a cap-forming slug during a pause of the second means following the receipt of said mass, said second means being operative to move the slug to a position adjacent a die, means for moving the slug from the last-mentioned position into the die during the pause of said second means following the last-mentioned movement thereof, means for indexing said support in unison with said second means, and means for operating the pressing means in unison with the slug-moving means.

11. An apparatus for applying caps to the heads of headed elements, comprising a turret having a circumferential series of cup-like dies, means for indexing said turret through the angle between successive dies, a plunger for depositing a soft metal mass in a die, a second plunger engageable in each die when the die has been indexed past the first plunger, and formed to cooperate with said die in pressing the mass into cup shape, a third plunger disposed, when the turret has been indexed to locate said die past the second plunger, to deposit a headed element into the die until the head of the element is in the cup-shaped mass and rests on the base of the cup-shaped mass, a fourth plunger cooperative with said die and having a cavity in its end and disposed, when said die has been indexed past said third plunger, to press the peripheral wall of the cup-shaped mass into a cover for the top of the element head, said fourth plunger having a relatively small vent extending transversely therethrough to the upper part of the cavity for the escape of air and excess cap material and stripping such excess from the cap upon separation of the fourth plunger from the die, a fifth plunger cooperative with said die and having an end cavity and disposed, when said die has been indexed past the fourth plunger, to press the cap material into final crown shape, means movable with one of said plungers and disposed within the flange beyond the fifth plunger for ejecting the capped element outwardly from the die when the turret has been indexed to such an extent that the element is substantially inverted, means including a member engageable in a die between the first and second plungers and operative in the absence of a mass from the last mentioned die to stop the turret and plungers with the plungers clear of the turret, and means for stopping the turret and plungers with the plungers clear of the turret upon the failure of the third plunger to feed an element.

12. In an apparatus for applying lead or other soft metal caps to nails and other elements, a cup-like die adapted to support therein a soft metal mass and having a hole in its base, a punch of substantially less diameter than the interior of the die, means for effecting relative approach of said die and punch to impart a cup shape to the mass, means for depositing a headed element in the cup-like mass and die, and a punch shaped to have a sliding telescopic fit in said die for pressing the skirt of the cup-like mass into a cap covering the head of the element.

13. In an apparatus for applying lead or other soft metal caps to nails and other elements, a cup-like die adapted to support a soft metal mass and having a hole in its base, a punch of substantially less diameter than the interior of the die, means for effecting relative approach of said die and punch to impart a cup shape to the mass, means for depositing a headed element in the cup-like mass and die, a punch shaped to have a sliding telescopic fit in said die for pressing the skirt of the cup-like mass into a cap covering the head of the element, the second punch having a vent for the escape of air and excess cap material, said vent being disposed so that such excess will be torn from said cap upon separation of said second punch and die, and a third punch having a telescopic fit in said die and formed to press said cap into finished shape.

WILLIAM E. OAKEY.